United States Patent
Rowley

(10) Patent No.: US 8,108,918 B2
(45) Date of Patent: Jan. 31, 2012

(54) ZERO KNOWLEDGE ATTRIBUTE STORAGE AND RETRIEVAL

(75) Inventor: Peter A. Rowley, Ben Lomond, CA (US)

(73) Assignee: Red Hat, Inc., Raleigh, NC (US)

( * ) Notice: Subject to any disclaimer, the term of this patent is extended or adjusted under 35 U.S.C. 154(b) by 536 days.

(21) Appl. No.: 11/712,261

(22) Filed: Feb. 27, 2007

(65) Prior Publication Data

US 2008/0209205 A1    Aug. 28, 2008

(51) Int. Cl.
*G06F 17/30* (2006.01)

(52) U.S. Cl. ......................................... 726/6

(58) Field of Classification Search ............... 713/153
See application file for complete search history.

(56) References Cited

U.S. PATENT DOCUMENTS

| | | | |
|---|---|---|---|
| 6,263,446 B1* | 7/2001 | Kausik et al. | 726/5 |
| 6,941,476 B2* | 9/2005 | Harrison et al. | 726/5 |
| 7,392,536 B2* | 6/2008 | Jamieson et al. | 726/8 |
| 7,571,472 B2* | 8/2009 | Royer | 726/19 |
| 7,818,255 B2* | 10/2010 | Pandya et al. | 705/51 |
| 2004/0054807 A1* | 3/2004 | Harvey et al. | 709/243 |
| 2005/0171872 A1* | 8/2005 | Burch et al. | 705/29 |
| 2005/0257072 A1* | 11/2005 | Cross et al. | 713/193 |
| 2005/0289644 A1* | 12/2005 | Wray | 726/5 |
| 2006/0059016 A1* | 3/2006 | Ogilvie | 705/2 |
| 2006/0136735 A1* | 6/2006 | Plotkin et al. | 713/182 |
| 2006/0288213 A1* | 12/2006 | Gasparini et al. | 713/170 |
| 2008/0005573 A1* | 1/2008 | Morris et al. | 713/180 |
| 2008/0215667 A1* | 9/2008 | Rothbarth et al. | 709/202 |

OTHER PUBLICATIONS

Sunib Higbsib, Hashing One Way Encryption Algorithm as of Feb. 17, 2005 http://web.archive.org/web/20050217121319/http://www.freevbcode.com/ShowCode.asp?ID=972.*

Kallahalla et al., Plutos: Scalable secure file sharing on untrusted storage, Proceedings of the 2nd Conference on File and Storage Technologies, Apr. 2003.*

Johnson, S., "Hashing (One Way Encryption) Algorithm", accessed at: http://web.archive.org/web/20050217121319/ http://freevbcode.com/ShowCode.asp?ID=972, 2 pages.

* cited by examiner

*Primary Examiner* — Neveen Abel Jalil
*Assistant Examiner* — Kevin Young
(74) *Attorney, Agent, or Firm* — Lowenstein Sandler PC

(57) ABSTRACT

Some embodiments of zero knowledge attribute storage and retrieval have been presented. In one embodiment, the content of a piece of data is encrypted at a client machine. Further, an identifier of the piece of data is hashed at the client machine. The encrypted content and the hashed identifier may be stored in a database maintained by a server without disclosing the content of the data to the server.

8 Claims, 5 Drawing Sheets

ZERO KNOWLEDGE ATTRIBUTE STORAGE AND RETRIEVAL

TECHNICAL FIELD

Embodiments of the present invention relate to electronic commerce (e-commerce), and more specifically to protecting and providing identity information in e-commerce.

BACKGROUND

Today, e-commerce is growing at a fast pace and offers great convenience to users. One important aspect in e-commerce is how to protect personal and/or private information. Sensitive personal and/or private information of users is frequently needed to complete transactions, such as ages of the users, addresses of the users, credit card information, etc. In addition to providing the information, the users have to prove to an entity, such as an online product/service provider, that the information provided is true and accurate. For example, an online wine seller may require a purchaser of alcohol to provide proof that the purchaser is over the legal drinking age.

One conventional approach for the users to prove to the online product/service providers that the information provided is true and accurate is to submit authenticated version or certified version of the information from an authoritative party to online product/service providers. The authoritative party as described herein refers to a party, trusted by the online product/service providers, that is authorized to certify that some predetermined information about the users is true and accurate. For example, the authoritative party may be a government agency, such as the departments of motor vehicles in various states, which are authorized to certify certain information, such as the driver license numbers and ages of drivers, in the respective states. As such, the users may request the authoritative party to send a certified version of their personal information to the online product/service providers.

However, the above approach may compromise the user's privacy for the following reason. When the authoritative party sends a certified version of the users' personal information to the online product/service providers, the authoritative party may keep track of the kind of personal information sent, the online product/service providers patronized by the users, the type of products and/or services accessed by the users, etc., without prior consent from the users. As a result, the authoritative party may collect and compile data on a user's online activities without the consent, or even the knowledge, of the user. Such action on the part of the authoritative party severely invades the privacy of the user.

DESCRIPTION OF THE DRAWINGS

The present invention is illustrated by way of example, and not by way of limitation, in the figures of the accompanying drawings and in which.

DETAILED DESCRIPTION

Figure 1:
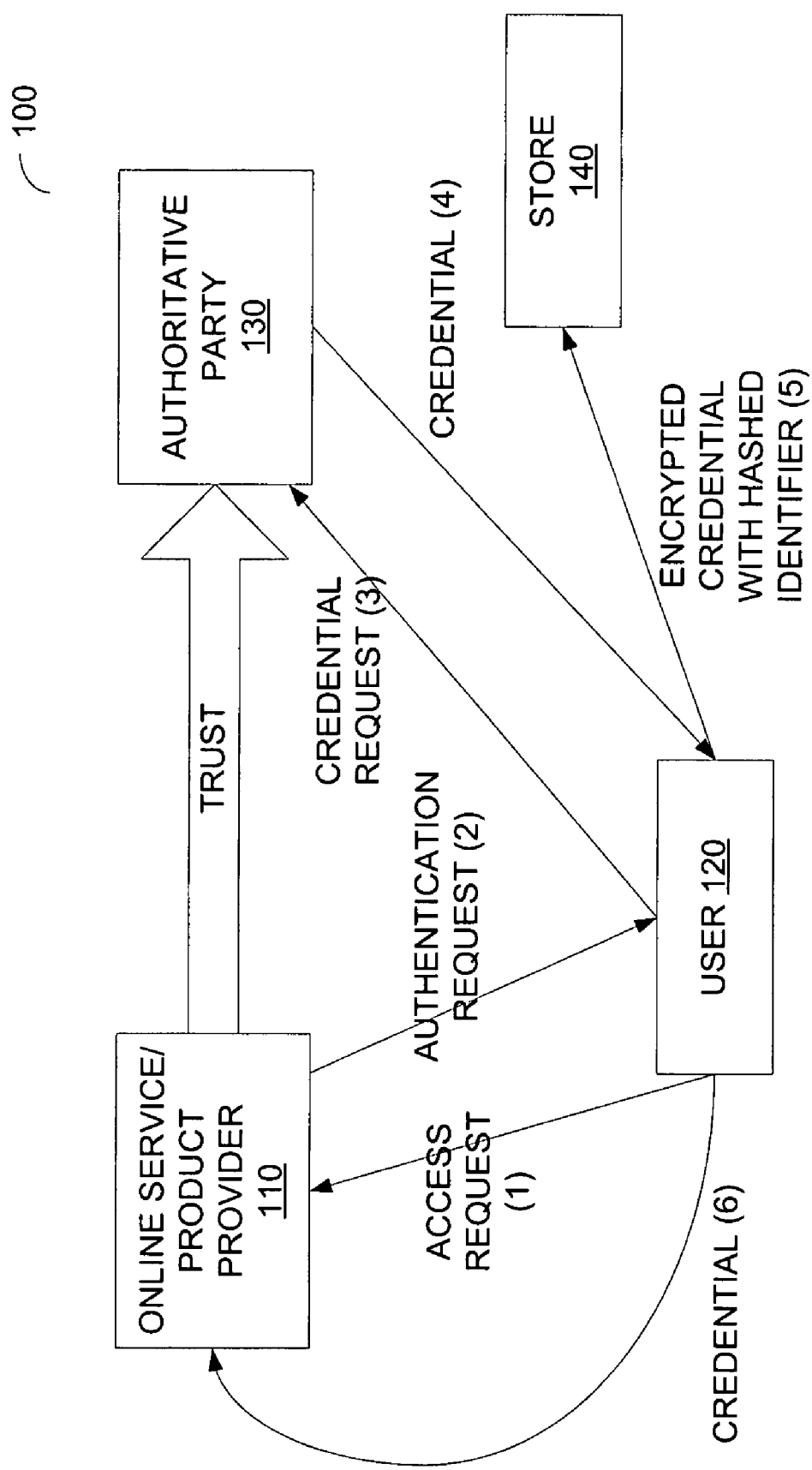
FIG. 1 illustrates one embodiment of a system in which embodiments of the present invention may be implemented.

Described herein are some embodiments of zero knowledge attribute storage and retrieval. In one embodiment, the content of a piece of data is encrypted at a client machine. Further, an identifier of the piece of data is hashed at the client machine. The encrypted content and the hashed identifier may be stored in a database maintained by a server without disclosing the content of the data to the server. In some embodiments, the encrypted content may be retrieved using the hashed identifier. The various techniques described herein may be useful for storing data containing sensitive personal and/or private information.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 illustrates one embodiment of a system in which embodiments of the present invention may be implemented. In some embodiments of the system 100, there are a user system (user) 120, an authoritative party system (authoritative party) 130, a third party system (third party) 110 (e.g., an online product/service provider), and a store 140. The user system 120 may interact with the third party 110, the authoritative party 130, and the store 140 via a network. The network may include various kinds of networks, such as a local area network (LAN), a wide area network (WAN), a wireless network, a wired network, etc. In some embodiments, the user system 120 may include a desktop personal computer (PC), a laptop PC, a personal digital assistant (PDA), a cellular telephone or mobile telephone, a portable media player (e.g., a digital music player), etc., accessible by a user, such as a natural person.

In some embodiments, the authoritative party 130 is authorized to certify some predetermined information, and thus, the third party 110 trusts the authoritative server 130 with respect to such information. One example of the authoritative party 130 is a government agency. The third party 110 in general is an entity that interacts with the user system 120 over a network, such as the Internet. For example, the third party 110 may be an online product/service provider that supplies or provides products and/or service over a publicly accessible network (e.g., the Internet), such as online wine sellers, motion picture streaming websites, a healthcare provider's website, etc. The store 140 is an entity that provides online storage for the user system 120. Specifically, the user system 120 may store data, such as some personal and/or private information, in the store 140. The store 140 may include a server and a database, where the server manages the database and the server may access data stored in the database. Alternatively, the store 140 may be internal to the user system 120.

In some embodiments, the user 120 sends an access request (1) to the third party 110. For example, the user system 120 may request to access a motion picture from the third party 110, which is a motion picture streaming website. In another example, the user system 120 may request to purchase wine from the third party 110, which is an online wine seller. Alternatively, the user system 120 may request to access the medical record of the user from the third party 110, which is a healthcare provider. In order for the third party 110 to grant access to the user system 120, the third party 110 has to authenticate the request by verifying some predetermined data of the user (e.g., the age of the user, the social security number of the user, etc.). Thus, the third party 110 sends an authentication request (2) to the user system 120.

In response to the authentication request (2), the user system 120 has to provide some personal data of the user, hereinafter, referred to as credential, to the third party 110. Referring back to the above example of the online wine seller, the credential required to authenticate the access request (1) is that the user is above a legal drinking age (e.g., twenty-one years old in some states). In order to prove that the user is over the legal drinking age, the user system 120 sends a credential request (3) to the authoritative party 130. In the current example, the credential request (3) is a request for a certification that the user 120 is over the legal drinking age. The authoritative party 130 then sends the credential (4), which includes a certified copy of the relevant data of the user, to the user system 120. Note that the user system 120 does not have to disclose to the authoritative party 130 why the user system 120 is requesting the credential (4).

Once the user system 120 receives the credential (4), the user system 120 may send the credential (6) to the third party 110. The user system 120 may have the credential (6) encrypted by a client machine before sending the credential (6) to the third party 110. To save time, and possibly cost, in obtaining the credential (4) in the future, the user system 120 may store an encrypted copy of the credential in the store 140. However, an identifier of the credential (e.g., a file name of the credential) may compromise the content of the credential (4). For instance, the server of the store 140 may be able to determine the type of content of the credential (4) from the identifier. Thus, to further protect the privacy of the user, the user system 120 may have the identifier of the credential (4) hashed by the client machine. Hashing the identifier disassociates the identifier from the content of the credential (4), thus making it more difficult for others to gain knowledge of the content of the credential (4) from the hashed identifier. The encrypted credential is then stored in the store 140 using the hashed identifier (5). Later, the user system 120 may retrieve the encrypted credential using the hashed identifier and decrypt the encrypted credential at a client machine that the user 120 is using. Thus, the user system 120 does not have to request the credential again from the authoritative party 130.

The above techniques provide many advantages for the user. One advantage is that the privacy of the user is better protected by the encryption of the content of the credential (4) and the hashing of the identifier of the credential (4). Since the identifier is hashed, the hashed identifier is disassociated from the content and thus, the server of the store 140 may not easily find out the content of the credential (4). Further, the user system 120 obtains the credential (4) directly from the authoritative party 130 and then sends the credential (6) to the third party 110. Hence, the authoritative party 130 does not have knowledge of the user's use of the credential (4) and/or the user's purpose of requesting the credential (4). As such, the authoritative party 130 may be prevented from collecting information on the activities of the user without prior consent from the user. Moreover, the store 140 may be accessible by the user from different client machines, such as from a PC at home, from a laptop PC at work, from a cellular telephone on the road, etc. By storing the encrypted credential and the hashed identifier (5) in the store 140, the user may conveniently and securely access the credential from different places using different client machines. Besides the credential from the authoritative party 130, the user system 120 may store other types of data in the store 140 safely using the techniques described herein. More details of some embodiments of the processes to store and to retrieve data are described below.

Figure 2A:
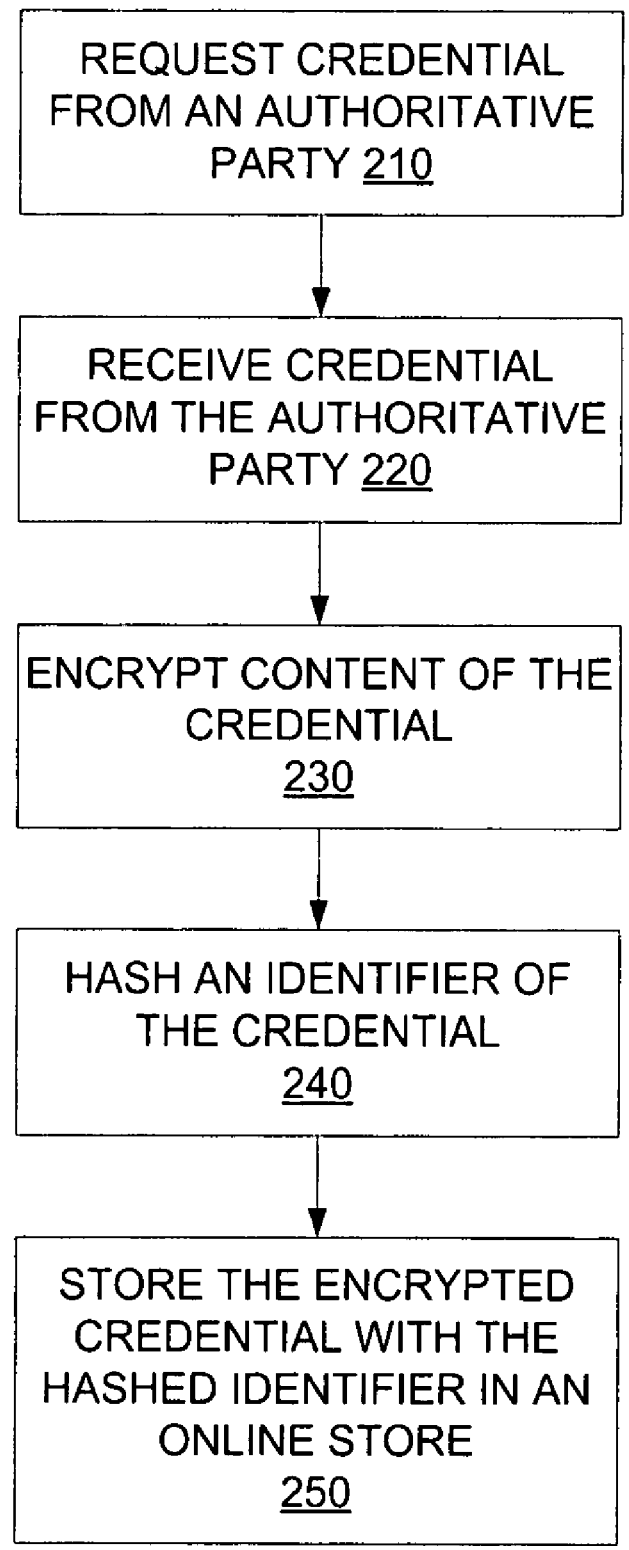
FIG. 2A illustrates a flow diagram of one embodiment of a process to store data.
Figure 2B:
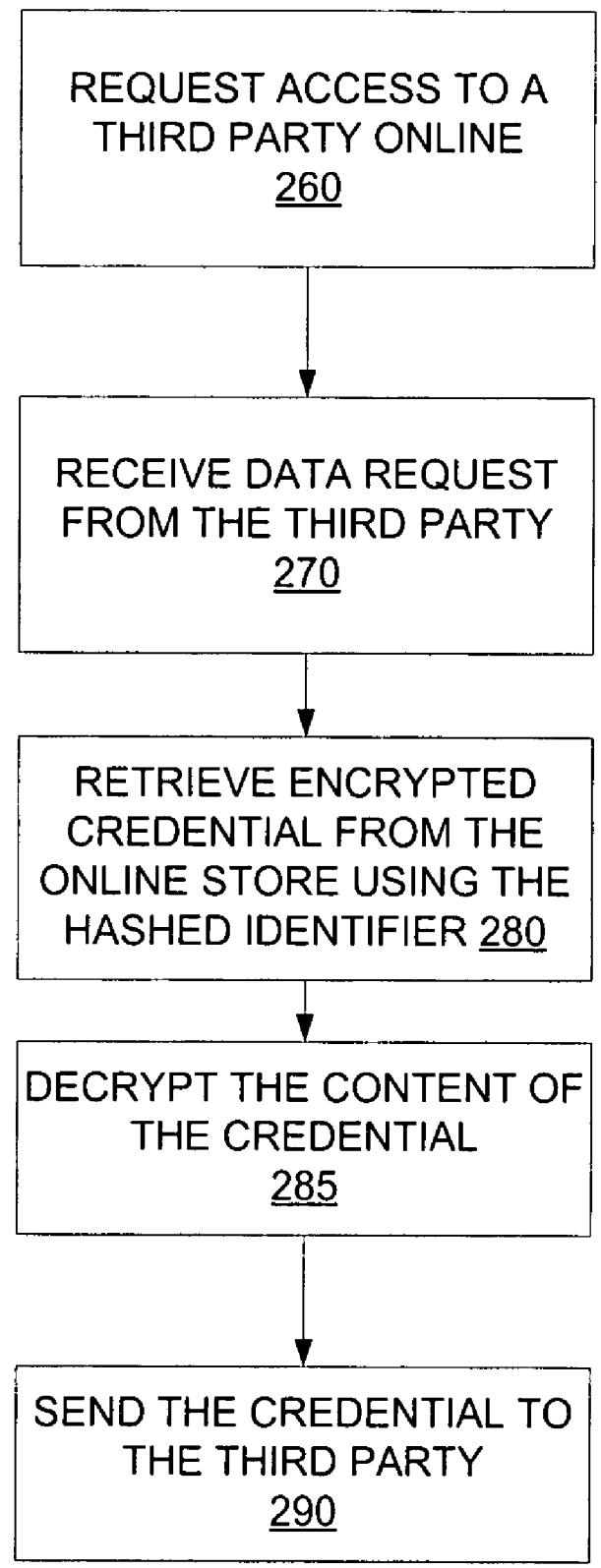
FIG. 2B illustrates a flow diagram of one embodiment of a process to retrieve data.

FIGS. 2A and 2B illustrate flow diagrams of one embodiment of a process to store data and one embodiment of a process to retrieve the data. The process may be performed by processing logic that may comprise hardware (e.g., circuitry, dedicated logic, programmable logic, microcode, etc.), software (such as instructions run on a processing device), firmware, or a combination thereof. For example, the process may be performed by a user's client machine (e.g., a cellular telephone, a PDA, a PC, etc.). In the following discussion, the data includes identity information of a user (e.g., the age of the user, driver license number of the user, social security number of the user, medical chart number of the user, etc.), and is therefore referred to as "credential." It should be appreciated that the technique disclosed is applicable to other types of data.

Referring to FIG. 2A, processing logic requests credential from an authoritative party (processing block 210). As discussed above, the authoritative party is authorized to certify that some predetermined information about the user is true and accurate, such as a government agency. Then processing logic receives the requested credential from the authoritative party (processing block 220).

To protect the security of the credential, processing logic encrypts the content of the credential (processing block 230). In some embodiments, processing logic encrypts the content using a private key. As such, the encrypted content cannot be decrypted without the private key. To further enhance data security, processing logic hashes an identifier of the credential to disassociate the hashed identifier from the content of the credential (processing block 240). By hashing the identifier, processing logic modifies the identifier in a way that is difficult for others to determine the original identifier from the hashed identifier. For example, processing logic may apply a hash function to the identifier, which may include a string of alphanumeric characters of any length, to generate a fixed-length string of alphanumeric characters. The hashed identifier is disassociated from the content such that it is difficult for others to determine or guess what the content of the credential is based on the hashed identifier.

In some embodiments, processing logic stores the encrypted content with the hashed identifier in an online store (processing logic 250). The online store may include a server operatively coupled to a database. Processing logic may send the encrypted content and the hashed identifier to the server without disclosing the hashing function used to the server. Processing logic may also withhold the private key used to encrypt the content from the server. The server stores the encrypted content in the database using the hashed identifier. But without any knowledge of the private key and the hashing function, the server is prevented from decrypting the content of the credential and/or guessing the content from the hashed identifier. As a result, the online store does not know what the online store is storing. Hence, the privacy of the user is better protected. When the user needs to access the credential, the user may retrieve the encrypted credential from the online store using the hashed identifier. One embodiment of a process to retrieve the credential is described below.

Referring to FIG. 2B, processing logic requests access to a third party's website on behalf of the user (processing block 260). For example, the third party may be an online wine seller and processing logic may request access to the purchasing area of the online wine seller's website. In another example, the third party may be a motion picture streaming website and processing logic may request access to a particular motion picture available on the website. In a third example, the third party may be a healthcare provider and processing logic may request access to the medical record of the user. Before allowing access, the third party may request some predetermined data from the user. In the current examples, the third party requests the credential of the user in order to authenticate the user.

Processing logic receives the data request from the third party (processing block 270). In response to the data request, processing logic retrieves the encrypted credential from the online store using the hashed identifier (processing block 280). Then processing logic decrypts the content of the credential (processing block 285). For example, processing logic may decrypt the content using the private key. Then processing logic may send the decrypted credential to the third party (processing logic 290). In an alternate embodiment, processing logic may encrypt the credential again using a second private key and send the encrypted credential to the third party. Then processing logic sends the second private key separately to the third party so that the third party can decrypt the encrypted credential. In other embodiments, processing logic may implement various data security procedures to protect the credential during transmission to the third party.

Figure 3:
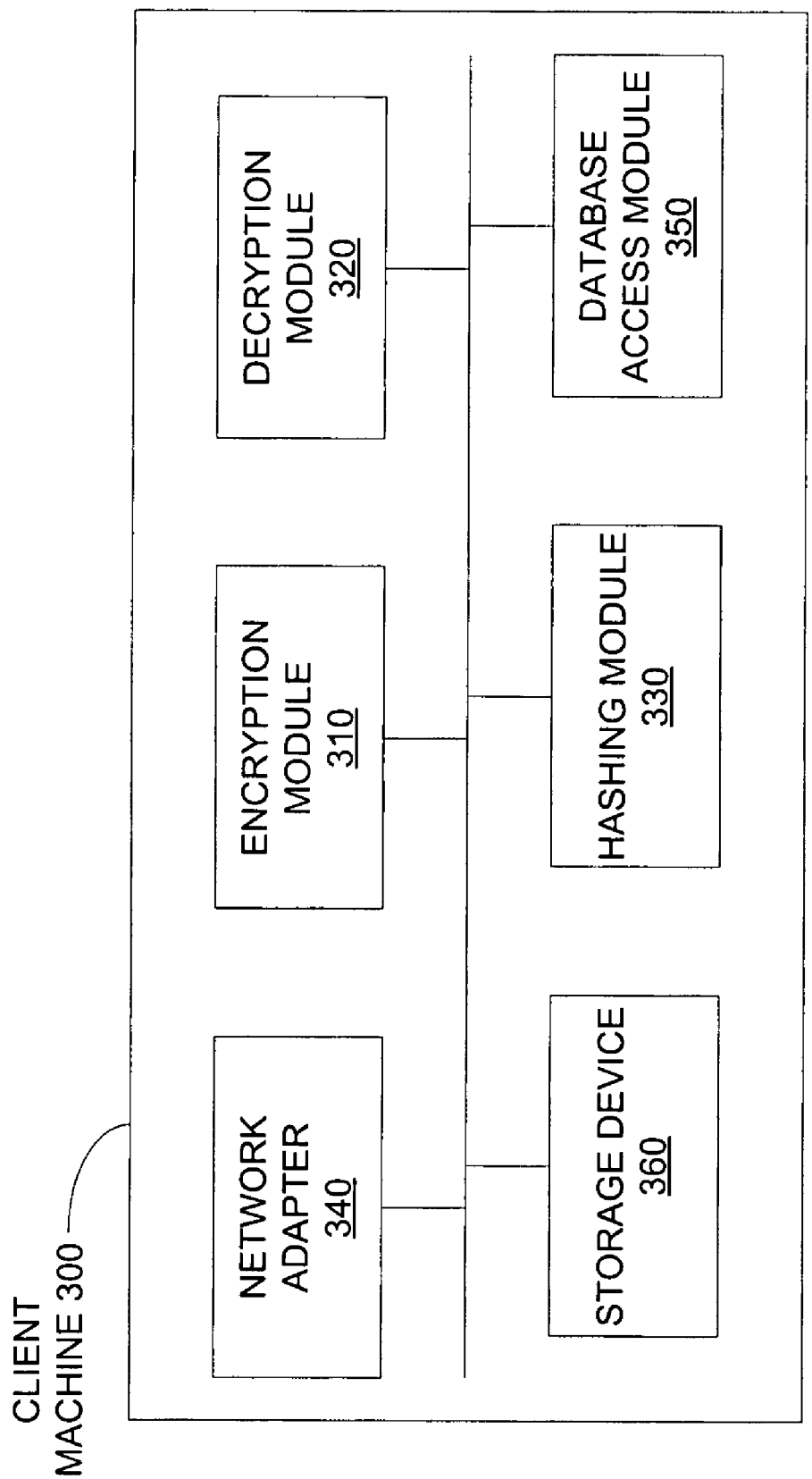
FIG. 3 illustrates a functional block diagram of one embodiment of a client machine.

FIG. 3 illustrates a functional block diagram of one embodiment of a client machine. The client machine 300 may be implemented using a desktop PC, a laptop PC, a PDA, a cellular telephone, a portable media player, etc. The client machine 300 includes an encryption module 310, a decryption module 320, a hashing module 330, a network adapter 340, a database access module 350, and a storage device 360, which are operatively coupled to each other.

In some embodiments, the network adapter 340 communicatively couples the client machine 300 to a network, which may include a local area network (LAN), a wide area network (WAN), the Internet, etc. The client machine 300 sends a request for data to an authoritative party using the network adapter 340. In response to the request, the authoritative party sends the data to the client machine 300, which receives the data via the network adapter 340. The data may include sensitive personal and/or private information of a user. To protect data security, the encryption module 310 encrypts the content of the data. For instance, the encryption module 310 may encrypt the content using a private key (e.g., a user-created password).

In some embodiments, the identifier of the data may be related to the content of the data, and thus, someone may readily determine and/or guess the content of the data from the identifier. To further enhance data security, the hashing module 330 hashes an identifier of the data (e.g., a file name of the data). For example, the identifier may be a string of alphanumeric characters of any length and the hashing module 330 may apply a hashing function to the identifier to convert the identifier into a fixed length string of alphanumeric characters. The hashed identifier is substantially different from the original identifier such that the hashed identifier is disassociated from the content of the data. As such, it becomes difficult for others to guess the content of the data from the hashed identifier. The encrypted content may be stored using the hashed identifier for later use.

In some embodiments, the client machine 300 stores the encrypted content using the hashed identifier in a database of an online store (e.g., the store 140 in FIG. 1) using the database access module 350. As explained above, the client machine 300 withholds the private key and the original identifier from the online store such that it is difficult, if not impossible, for the online store to find out what the content of the data is. The client machine 300 may or may not retain the private key.

Alternatively, the client machine 300 stores the encrypted content using the hashed identifier in the storage device 360 within the client machine 300. However, the original identifier of the data is not stored in the storage device 360. Further, the encryption module 310 withholds the private key from the storage device 360 and may discard the private key after the content has been encrypted. To decrypt the content, the user has to provide the private key to the client machine 300 again. Thus, others coming into possession of the client machine 300 may not decrypt the content of the data nor guess the content from the original identifier even though the encrypted content and the hashed identifier are stored in the storage device 360 in the client machine 300. The above security feature is particularly useful for portable and/or mobile client devices, such as laptop PCs, PDAs, cellular telephones, portable media players, etc., which may be lost or stolen easily.

In response to the user's request to access the stored data, the database access module 350 may send a request to the online store to retrieve the encrypted content using the hashed identifier. Alternatively, the database access module 350 may retrieve the encrypted content from the storage device 360 using the hashed identifier. Then the decryption module 320 decrypts the encrypted content using the private key. In some embodiments where the client machine 300 has discarded the private key after encrypting the content, the user has to provide the private key to the client machine 300 again for decrypting the content. After the content has been decrypted, the user may use the data. For example, the user may send the data to a third party who has requested the data from the user. Some examples of the use of the data have been discussed above.

Figure 4:
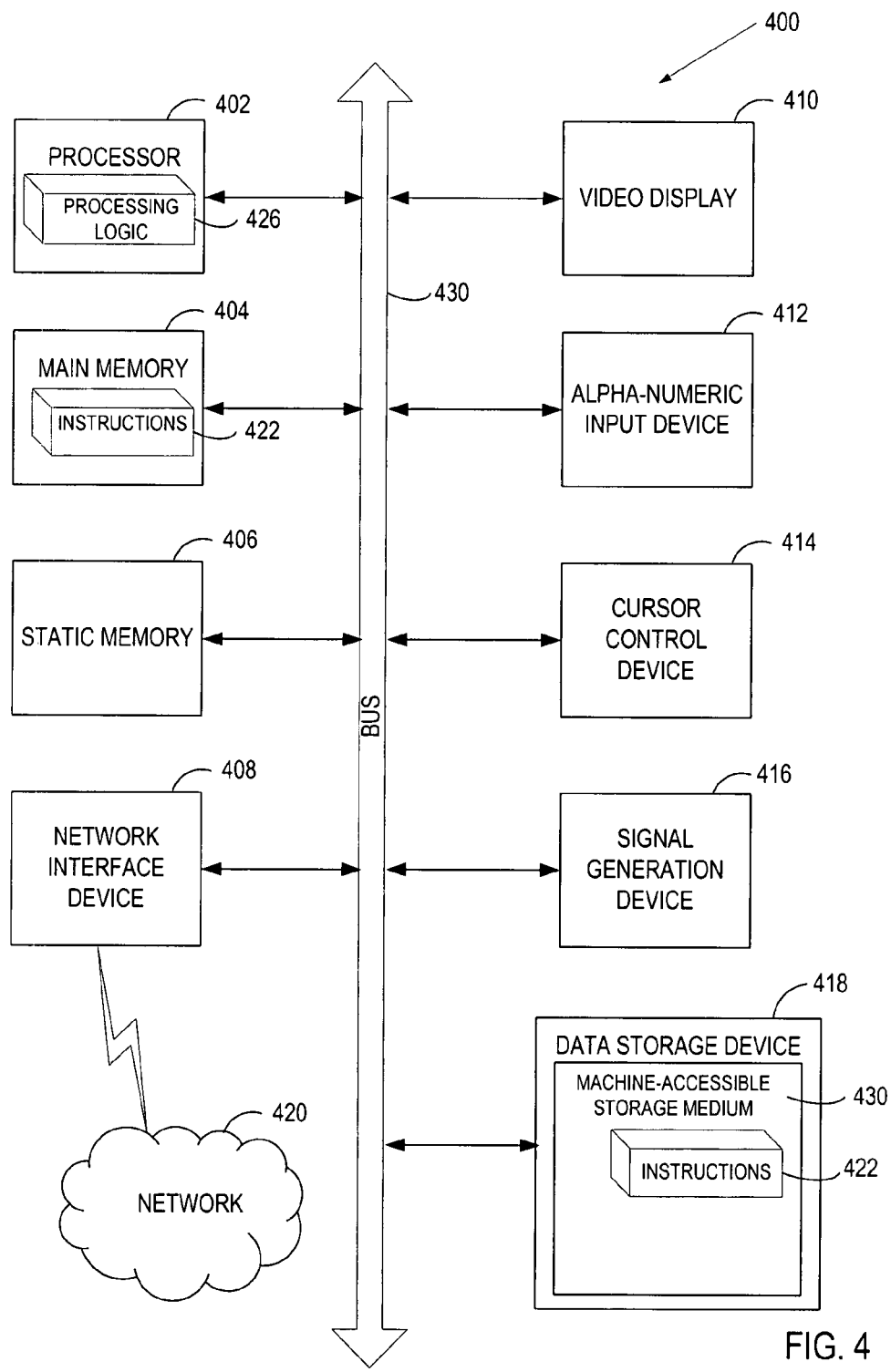
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of zero knowledge attribute storage and retrieval have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    a client machine requesting a certified copy of a piece of data from an authoritative party trusted by a third party in response to a first data request from the third party, wherein the piece of data comprises an age of a user of the client machine;
    encrypting content of the certified copy of the piece of data using a private key at the client machine;
    modifying a file name of the piece of data to disassociate the content of the piece of data from the modified file name;
    storing the encrypted content and the modified file name in a database maintained by a server, separate from the authoritative party, without disclosing the content of the piece of data to the server;
    the client machine withholding the private key from the server to prevent the server from decrypting the encrypted content;
    the client machine discarding the private key after storing the encrypted content in the database;
    the client machine retrieving the encrypted content from the database using the modified file name in response to a second data request;
    the client machine receiving a second copy of the private key from the user;
    the client machine decrypting the encrypted content from the database using the second copy of the private key; and sending the content decrypted from the client machine to the third party.

2. The method of claim 1, wherein the piece of data comprises identity information of a user.

3. The method of claim 1, wherein the server is coupled to the client machine via a publicly accessible network.

4. An apparatus comprising:
- a network interface in a client device to send a request for a certified copy of a piece of data from an authoritative server trusted by a third party in response to a first data request from the third party, wherein the piece of data comprises an age of a user of the client device; and
- a processing device coupled to the network interface in the client device, to execute
  - an encryption module to encrypt content of the certified copy of the piece of data using a private key,
  - a hashing module to modify a file name of the piece of data such that the modified file name of the piece of data is disassociated from the content of the piece of data, wherein the network adapter is operable to send the encrypted content of the piece of data and the modified file name via a network to a server, separate from the authoritative server, to store the encrypted content in a database using the modified file name, wherein the private key is withheld from the database to prevent the server from decrypting the encrypted content and is discarded after the encrypted content has been stored in the database,
  - a database access module to retrieve the encrypted content of the piece of data using the modified file name from the database in response to a second data request, and
  - a decryption module to decrypt the encrypted content from the database using a second copy of the private key received from the user, wherein the decrypted content is sent to the third party.

5. The apparatus of claim 4, wherein the piece of data comprises identity information of a user.

6. A machine-readable storage medium that provides instructions that, if executed by a processor, will cause the processor to perform operations comprising:
- a client machine requesting a certified copy of a piece of data from an authoritative party trusted by a third party in response to a first data request from the third party, wherein the piece of data comprises an age of a user of the client machine;
- encrypting content of the certified copy of the piece of data at the client machine using a private key;
- modifying a file name of the piece of data to disassociate the content of the piece of data from the modified file name;
- storing the encrypted content and the modified file name in a database maintained by a server, separate from the authoritative party, without disclosing the content of the piece of data to the server;
- withholding the private key, by the client machine, from the server to prevent the server from decrypting the encrypted content;
- discarding, by the client machine, the private key after storing the encrypted content in the database;
- retrieving, by the client machine, the encrypted content from the database using the modified file name in response to a second data request;
- receiving, by the client machine, a second copy of the private key from the user;
- decrypting the encrypted content from the database at the client machine using the second copy of the private key; and
- sending the content of the certified copy of the piece of data from the client machine to the third party.

7. The machine-readable storage medium of claim 6, wherein the piece of data comprises identity information of a user.

8. The machine-readable storage medium of claim 6, wherein the server is coupled to the client machine via a publicly accessible network.

* * * * *